US012404990B1

(12) United States Patent
Meng

(10) Patent No.: US 12,404,990 B1
(45) Date of Patent: Sep. 2, 2025

(54) PLUG-IN GROUND LIGHT

(71) Applicant: Shenzhen Fuchengxiang Photoelectric Technology Co., Ltd., Shenzhen (CN)

(72) Inventor: Fuwen Meng, Jiangxi (CN)

(73) Assignee: Shenzhen Fuchengxiang Photoelectric Tech., Shenzhen (CN)

( * ) Notice: Subject to any disclaimer, the term of this patent is extended or adjusted under 35 U.S.C. 154(b) by 0 days.

(21) Appl. No.: 19/035,596

(22) Filed: Jan. 23, 2025

(30) Foreign Application Priority Data

Jan. 16, 2025 (CN) .......................... 2025200975880
Jan. 16, 2025 (CN) .......................... 2025200977509

(51) Int. Cl.

| | |
|---|---|
| ***F21V 15/01*** | (2006.01) |
| ***F21S 6/00*** | (2006.01) |
| ***F21V 17/12*** | (2006.01) |
| ***F21V 21/08*** | (2006.01) |
| ***F21V 23/00*** | (2015.01) |
| ***F21V 31/00*** | (2006.01) |
| ***F21Y 115/10*** | (2016.01) |

(52) U.S. Cl.
CPC .............. *F21V 15/01* (2013.01); *F21S 6/005* (2013.01); *F21V 17/12* (2013.01); *F21V 21/0824* (2013.01); *F21V 23/002* (2013.01); *F21V 31/005* (2013.01); *F21Y 2115/10* (2016.08)

(58) Field of Classification Search
CPC ...... F21S 6/005–008; F21V 15/01–015; F21V 17/12–168; F21V 21/0824; F21V 23/001–002; F21V 31/00–005; F21Y 2115/10
See application file for complete search history.

(56) References Cited

U.S. PATENT DOCUMENTS 7,196,477 B2 * 3/2007 Richmond ............. H05B 47/10
315/149

* cited by examiner

*Primary Examiner* — Jason M Han
(74) *Attorney, Agent, or Firm* — Justin Lampel

(57) ABSTRACT

Provided is a plug-in ground light, including a ground plug pin, a light pole assembly, a light-emitting module, and a functional member. The light pole assembly includes a mounting assembly connected to the ground plug pin and a protective cover connected to the mounting assembly. The protective cover has an open state and a closed state relative to the mounting assembly. The light-emitting module is disposed in the mounting assembly. The functional member is disposed in the mounting assembly. When the protective cover is in the open state, the functional member is exposed, and when the protective cover is in the closed state, the protective cover obscures the functional member. The functional member is configured to control at least one of an operating state, luminous intensity, a luminous color, and an operating mode of the light-emitting module.

15 Claims, 8 Drawing Sheets

PLUG-IN GROUND LIGHT

TECHNICAL FIELD

The present disclosure relates to the technical field of lights, and in particular to a plug-in ground light.

BACKGROUND

As an outdoor lighting device, the plug-in ground light is usually mounted on the ground, to provide lighting for places such as roads, parks, and courtyards. In related technologies, the single plug-in ground light usually has fixed lighting patterns such as the fixed illumination brightness, which greatly limits the application scenarios of the plug-in ground light.

SUMMARY

Embodiments of the present disclosure provide a plug-in ground light, to expand a usage scene of the plug-in ground light.

A plug-in ground light includes:

a ground plug pin;

a light pole assembly, including a mounting assembly connected to the ground plug pin and a protective cover connected to the mounting assembly, where the protective cover has an open state and a closed state relative to the mounting assembly;

a light-emitting module, disposed in the mounting assembly; and a functional member, disposed in the mounting assembly, where when the protective cover is in the open state, the functional member is exposed, when the protective cover is in the closed state, the protective cover obscures the functional member, the functional member is configured to control at least one of an operating state, luminous intensity, a luminous color, and an operating mode of the light-emitting module.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
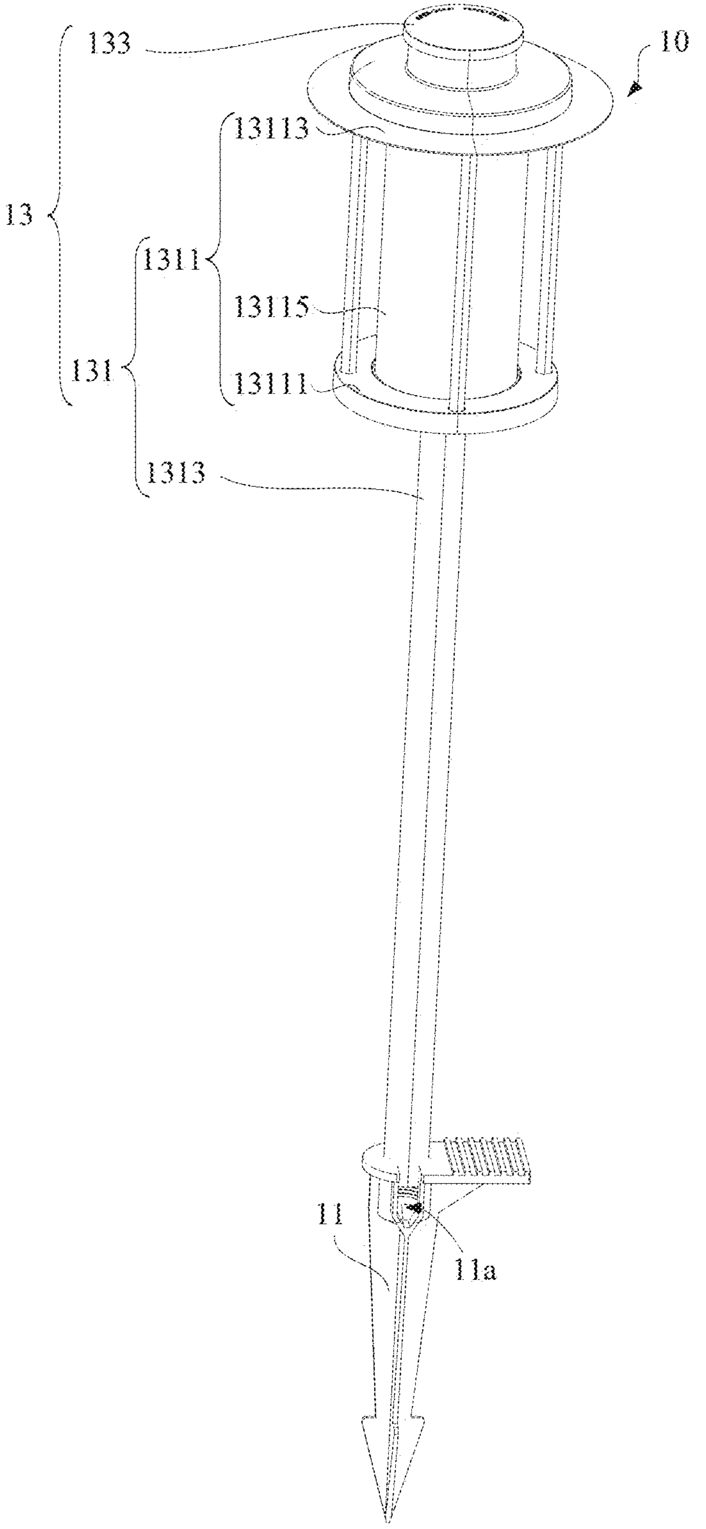
FIG. 1 is a schematic diagram of a protective cover of a plug-in ground light in a closed state according to Embodiment 1 of the present disclosure.

Detailed description of the preferred embodiments is a preferred mode of implementation of the present disclosure. The description has no limitation, and is intended to illustrate the general principles of the present disclosure.

It should be understood that, in order to facilitate the understanding of the present disclosure, the terms “mounting”, “connection”, “coupling”, and “installation” in the following description refer to the connection relationships in the accompanying drawings. For example, “connection” may be understood as a permanent connection or a detachable connection. In addition, “connection” may also be understood as a direct connection, an indirect connection, or a connection implemented via other auxiliary components. Therefore, the above terms should not be a limitation to an actual connection of the elements in the present disclosure.

It should be noted that, the terms such as “length”, “width”, “top”, “bottom”, “front”, “rear”, “left”, “vertical”, “horizontal”, “upper”, “lower”, “outer”, and “inner” are used to indicate the orientation or position relationship in the accompanying drawings. To facilitate the understanding of the present disclosure, an actual position or orientation in the present disclosure is not limited. Therefore, the above terms are not limited to the actual positions of all components in the present disclosure.

It should be understood that the terms such as “first”, “second”, “a”, “an”, and “one” in the embodiments refer to “at least one” or “one or more”. Specially, the term “a” may refer to “one” in an embodiment and “more than one” in another embodiment. Therefore, the above terms are not limited to actual figures of the components in the present disclosure.

To facilitate the understanding of the present disclosure, the present disclosure is described more completely below with reference to the accompanying drawings. Preferred embodiments of the present disclosure are shown in the drawings. However, the present disclosure is embodied in various forms without being limited to the embodiments set forth herein. On the contrary, these embodiments are provided to make the understanding of the present disclosure more thorough and comprehensive.

Embodiment 1

Figure 2:
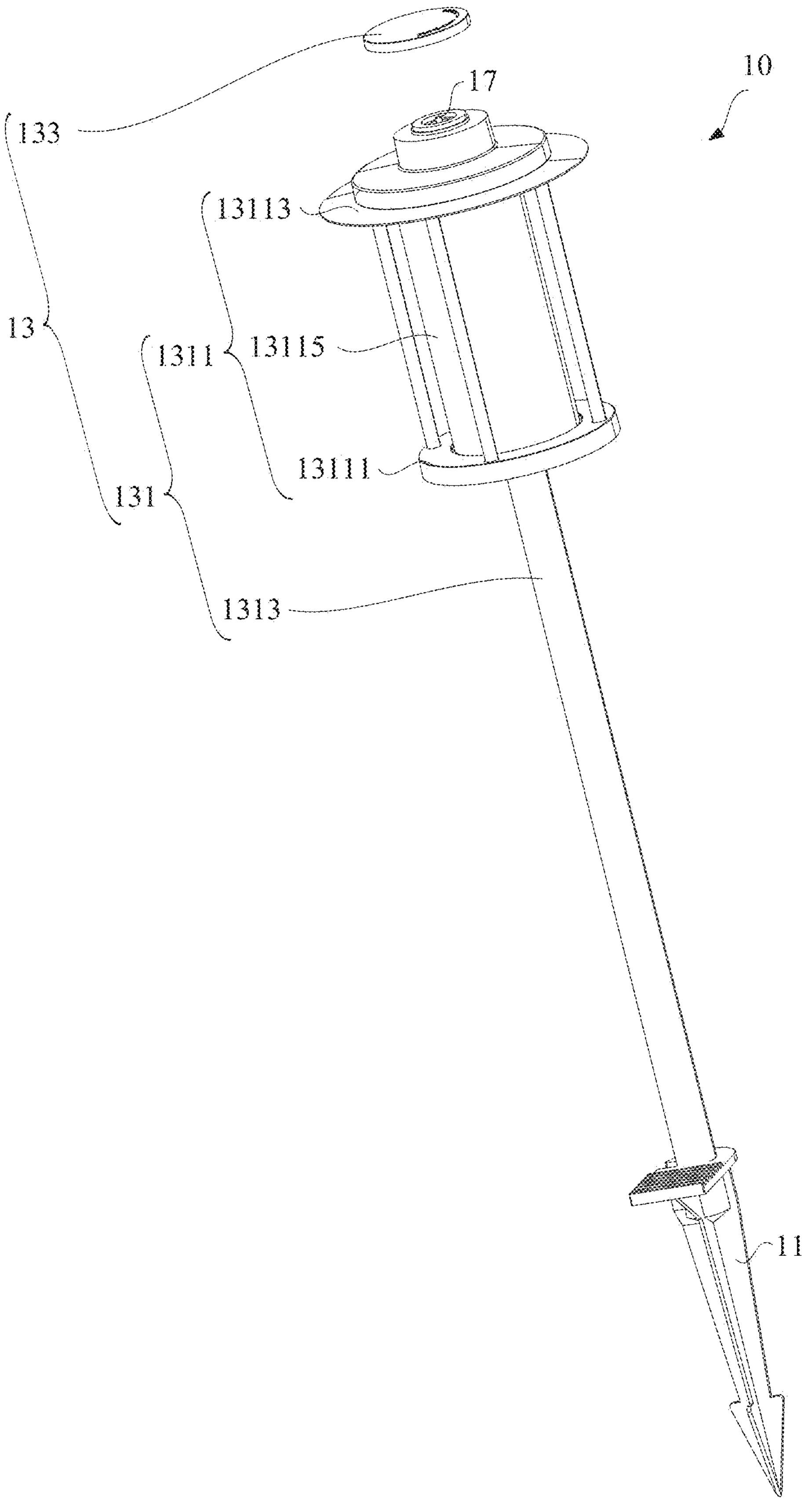
FIG. 2 is a schematic diagram of a protective cover of a plug-in ground light in an open state according to Embodiment 1 of the present disclosure.
Figure 3:
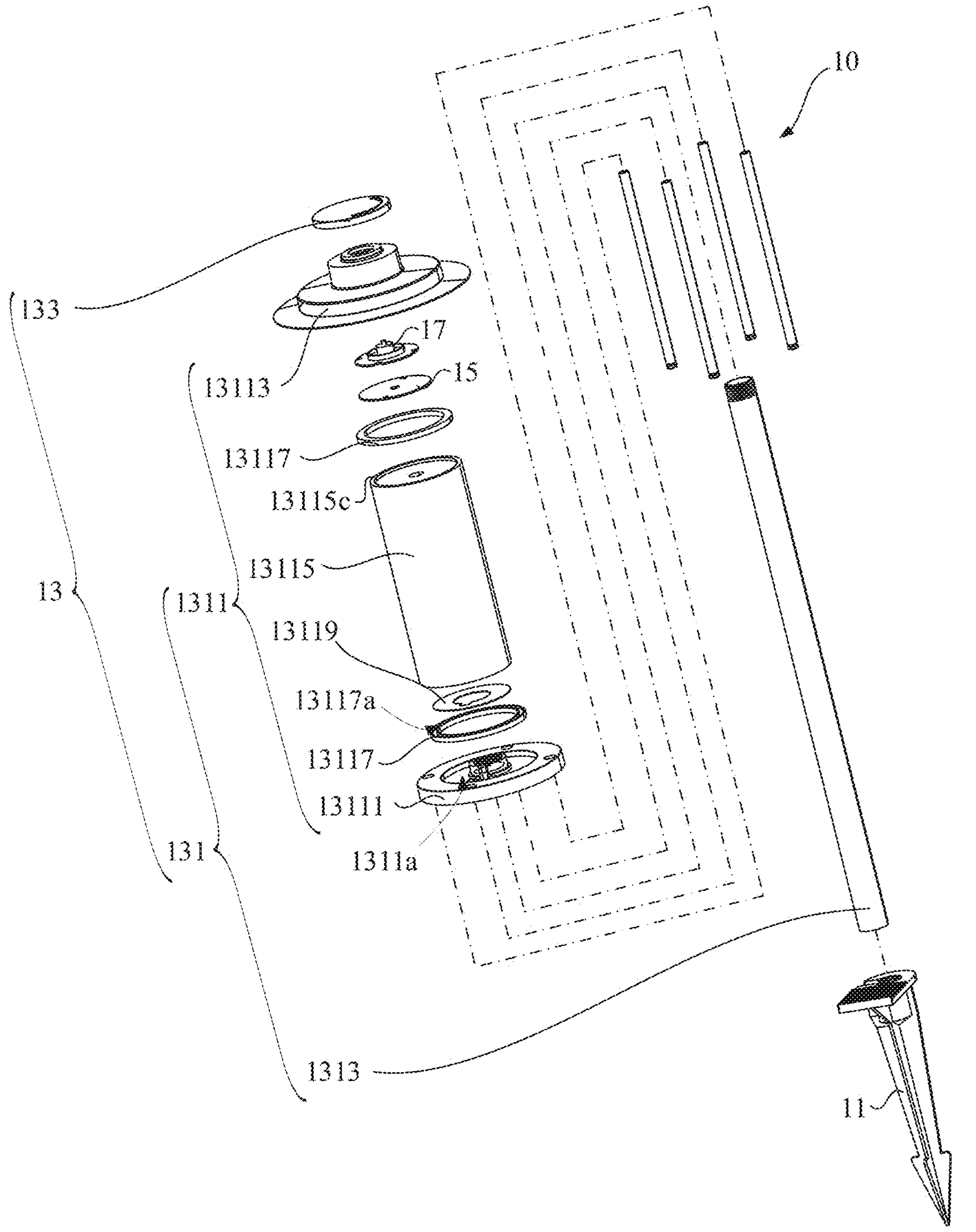
FIG. 3 is an exploded view of a plug-in ground light according to Embodiment 1 of the present disclosure.

Referring to FIG. 1, FIG. 2, and FIG. 3, Embodiment 1 of the present disclose provides a plug-in ground light 10. The plug-in ground light 10 includes a ground plug pin 11, a light pole assembly 13, a light-emitting module 15, and a functional member 17. The light pole assembly 13 is connected to the ground plug pin 11, and the light-emitting module 15 and the functional member 17 are disposed in the light pole assembly 13. One end of the ground plug pin 11 is relatively sharp and may be inserted into the ground, thereby reliably fixing the plug-in ground light 10 on the ground for providing lighting. The light-emitting module 15 may include a light-emitting diode (LED) bead. The LED bead may emit light after being energized. In some implementations, the light-emitting module 15 may include a plurality of LED beads that may emit different colors of light. For example, the light-emitting module 15 includes at least two of a red LED bead, a blue LED bead, a green LED bead, and a white LED bead.

Certainly, the plug-in ground light 10 may include a circuit board. The circuit board is disposed in the light pole assembly 13, and a control circuit of the plug-in ground light 10 may further be integrated with the circuit board. The control circuit may control a working state of the light-emitting module 15, for example, turning on or off, controlling luminous intensity of the light-emitting module 15, controlling a luminous color of the light-emitting module 15, or controlling a working mode of the light-emitting module 15. The working mode is not limited to an automatic change in brightness of the light, or an automatic change in a color of the light. For example, an ambient light sensor and a timer may be integrated with the circuit board. Therefore, automatic turning on or off in a preset period of time may be implemented by detecting intensity of ambient light in the evening in combination with the timer. In some implementations, the light-emitting module 15 may be integrated with the circuit board.

Figure 4:
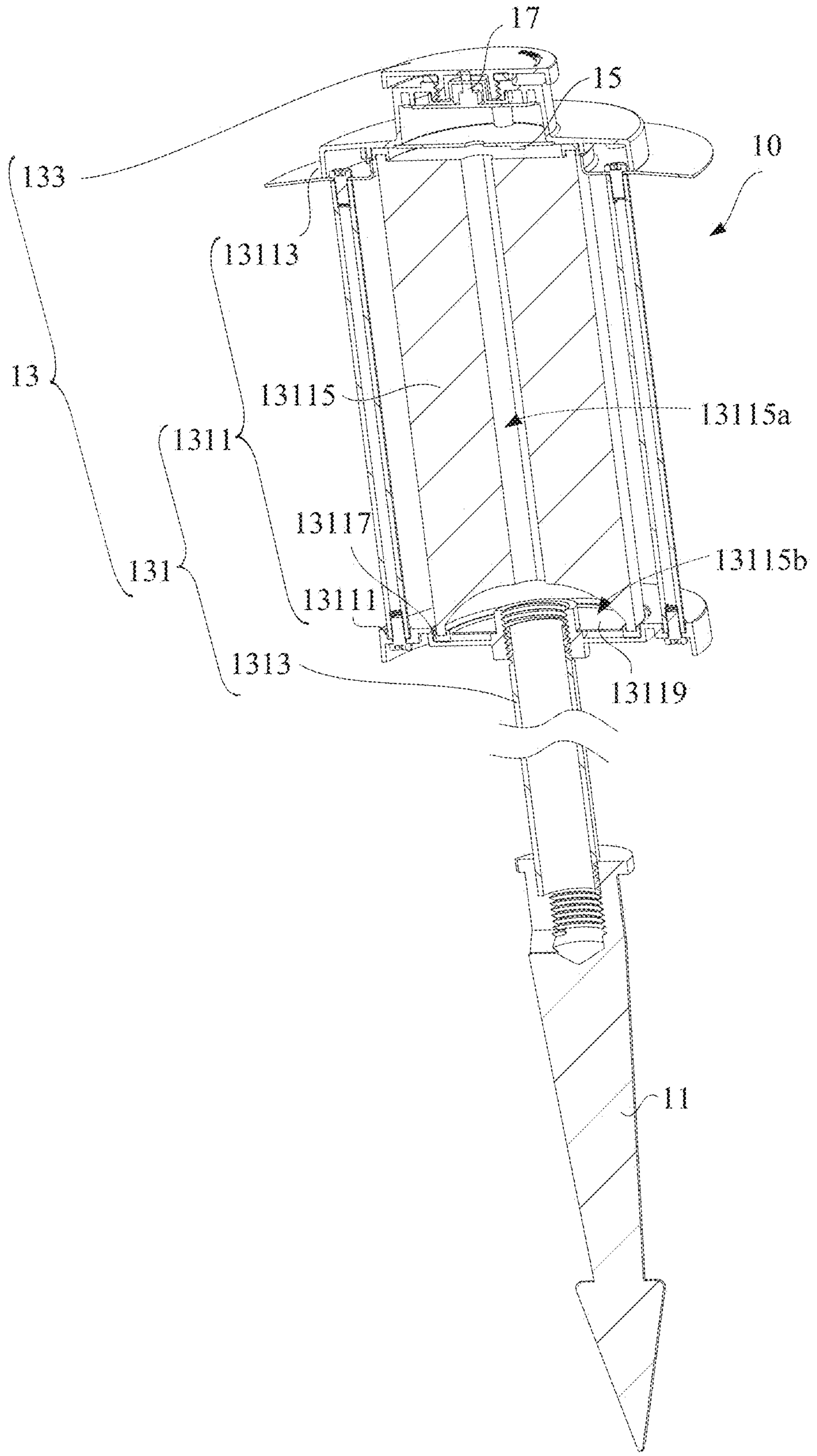
FIG. 4 is a sectional view of a plug-in ground light according to Embodiment 1 of the present disclosure.

Referring to FIG. 4, a light pole assembly 13 includes a mounting assembly 131 connected to the ground plug pin 11 and a protective cover 133 connected to the mounting assembly 131. The light-emitting module 15 and the functional member 17 are disposed in the mounting assembly 131. The protective cover 133 has an open state and a closed state relative to the mounting assembly 131. The functional member 17 is in a telecommunication connection or a communication connection to the control circuit. The functional member 17 is not limited to a mechanical button or a touch button, and may further be a trigger structure or an adjustment structure for providing another function. The present disclosure uses a button as an example for description. When the protective cover 133 is in the open state, as shown in FIG. 2, the functional member 17 is exposed, and a user may press the button to control the operating state, the luminous intensity, the luminous color, the working mode of the light-emitting module 15. When the protective cover 133 is in the closed state, as shown in FIG. 1, the protective cover 133 obscures the functional member 17, to avoid an accidental contact generated because the functional member 17 is exposed. Certainly, the protective cover 133 may further enable a waterproof function for the functional member 17, to ensure working reliability and service life of the functional member 17. Certainly, in some implementations, the protective cover 133 may further prevent the functional member 17 from being affected by dust, that is, dustproof effect.

In other implementations, the functional member 17 may be integrated with a wireless signal receiving module, for example, an infrared signal receiving module, and integrated with a short-range wireless signal receiving module, for example, a 433 MHz signal receiving module or a 2.4G signal receiving module. When the protective cover 133 is in the closed state, the protective cover 133 and the mounting assembly 131 enclose the functional member 17 in isolated space. Therefore, the protective cover 133 may block a close-range wireless communication signal or enable a close-range wireless communication signal to be absorbed or reflected, and the close-range wireless communication signal is attenuated until the functional member 133 is not triggered, thereby providing anti-trigger effect in the closed state and implementing normal triggering in the open state.

In some implementations, the protective cover 133 is detachably connected to the light pole assembly 13. Specifically, in the embodiment 1 of the present disclosure, the mounting assembly 131 includes a mounting base 1311 and a middle pole 1313. The light-emitting module 15 and the functional member 17 are disposed in the mounting base 1311, the middle pole 1313 is in a long tube shape, and has one end connected to the ground plug pin 11 and the other end connected to the mounting base 1311, and the protective cover 133 is connected to the mounting base 1311. In some implementations, the middle pole 1313 is in a hollow tube shape, the ground plug pin 11 is detachably connected to the middle pole 1313, a wire hole 11*a* is provided at a junction, and the wire hole 11*a* is configured to allow a cable to pass through. The cable can pass through the middle pole 1313 and extend to the light-emitting module 15 of the mounting base 1311, to be in a telecommunication connection to the light-emitting module 15. The cable may be used for an external power supply, to supply power to the light-emitting module 15. In other implementations, the middle pole 1313 may be in other shapes such as a square tube shape.

Still referring to FIG. 3 and FIG. 4, the mounting base 1311 includes a base plate 13111, a carrier member 13113, and a light guide member 13115 connected between the base plate 13111 and the carrier member 13113. The middle pole 1313 is connected to the base plate 13111, the light-emitting module 15 and the functional member 17 are disposed in the carrier member 13113, and the protective cover 133 is connected to the carrier member 13113. For example, in the implementation in FIG. 2, the protective cover 133 is connected to the carrier member 13113 in a threaded manner. For example, the protective cover 133 has an internal thread, and the carrier member 13113 has an external thread that is fitted with the internal thread of the protective cover 133, to implement the screwing between the internal thread and the external thread. The protective cover 133 may be easily unscrewed from the carrier member 13113 without the use of other tools, thereby exposing the functional member 17 and facilitating an operation by the user. After the operation is completed, the user can conveniently mount the protective cover 133 in the carrier member 13113, thereby preventing an accidental contact and providing protection for the functional member 17. In other implementations, a side of the protective cover 133 may be rotatably connected to the carrier member 13113. Therefore, the protective cover 133 may be in the open state or the closed state relative to the carrier member 13113. In other implementations, the protective cover 133 may be clamped in the carrier member 13113, and may also be conveniently opened and closed. Therefore, the protective cover 133 may be in the open state or the closed state. This is convenient for the operation of the user.

The carrier member 13113 may be used to provide mounting space for the circuit board and light-emitting module 15 of the plug-in ground light 10, limit and protect the circuit board and light-emitting module 15 of the plug-in ground light 10. The carrier member 13113 may be a metal member, or a non-metallic member with relatively low light transmittance, for example, a plastic member or a ceramic member. A material of the base plate 13111 may be the same as or not the same as that of the carrier member 13113. In the implementations in FIG. 3 and FIG. 4, the light guide member 13115 is in a cylindrical shape and partially extends in the carrier member 13113. The carrier member 13113 encloses at least a part of the light guide member 13115, to reliably limit the light guide member 13115 into the carrier member 13113. Due to shading effect of the carrier member 13113, leakage of light from a connection position of the light guide member 13115 and the carrier member 13113 is reduced. A material of the light guide member 13115 may be plastic or glass with suitable light transmittance. Light emitted from the light-emitting module 15 may be emitted to the light guide member 13115, and a propagation direction of the light may be changed via the light guide member 13115, for example, by dispersing the light, thereby expanding an irradiation range of the light-emitting module 15.

Further, referring to FIG. 4, a through hole 13115*a* is axially provided on the light guide member 13115, the through hole 13115*a* extends from one end of the light guide member 13115 to the other end of the light guide member 13115 along a center shaft of the light guide member 13115, and the through hole 13115*a* communicates with an interior of the middle pole 1313 and configured to allow the cable to pass through. This structure prevents the cable from being exposed outside, to protect the cable.

Further, one end, away from the carrier member 13113, of the light guide member 13115 is recessed towards a side on which the carrier member 13113 is located, to form a groove 13115*b*, and the groove 13115*b* communicates with the through hole 13115*a*. The groove 13115*b* may be used to avoid a connection part of the base plate 13111 and the middle pole 1313, to accommodate the connection part of the base plate 13111 and the middle pole 1313 into the groove 13115*b*, thereby improving structural compactness, and enabling the plug-in ground light 10 to have a simple appearance.

Further, the mounting base 1311 may include a sealing member 13117. The sealing member 13117 is in an annulus shape and circumferentially provided with an accommodation groove 13117*a*. A material of the sealing member 13117 may be silica gel or rubber. A convex ring 13115*c* matching the accommodation groove 13117*a* is disposed at each of two opposite ends of the light guide member 13115. There may be two sealing members 13117. One sealing member 13117 is configured to seal a gap between the light guide member 13115 and the base plate 13111, and the other sealing member 13117 is configured to seal a gap between the carrier member 13113 and the light guide member 13115, to enable the mounting base 1311 of the plug-in ground light 10 to have good waterproof and dustproof performance. Further, in some implementations, a side, facing the base plate 13111, of the carrier member 13113 and a side, facing the carrier member 13113, of the base plate 13111 may be recessed, to form a recessed groove 1311*a*, to accommodate the sealing member 13117 in the recessed groove 1311*a*, thereby improving reliability of limiting the sealing member 13117 in the carrier member 13113 and the base plate 13111, and improving structural compactness of the plug-in ground light 10.

Further, referring to FIG. 3 and FIG. 4, the mounting base 1311 may include a reflective sheet 13119, and the reflective sheet 13119 is disposed on a side, facing the light-emitting module 15, of the base plate 13111. The reflective sheet 13119 has a surface with relatively high reflectivity, and the surface with relatively high reflectivity faces the light-emitting module 15, to reflect a part of the light emitting to the base plate 13111 by the light guide member 13115 back to the light guide member 13115, thereby improving a utilization rate of light energy. The reflective sheet 13119 may be an aluminum foil, or a non-metallic sheet coated with a thin reflective film.

Further, in some implementations, two opposite ends of the middle pole 1313 may be connected to the base plate 13111 and the ground plug pin 11 respectively in a threaded manner. In this implementation, convenience for assembling the middle pole 1313, the ground plug pin 11, and the base plate 13111 is improved, and convenience for transporting, disassembling, and maintaining the plug-in ground light 10 is improved, to enable the user to conveniently assemble the plug-in ground light 10, and conveniently disassemble and replace the plug-in ground light 10 in case of a problem. Similarly, the base plate 13111 and the carrier member 13113 may be detachably connected to the light guide member 13115 respectively, to improve convenience for assembling the base plate 13111, the carrier member 13113, and the light guide member 13115, and improve convenience for transporting, disassembling, and maintaining the plug-in ground light 10, thereby enabling the user to conveniently assemble the plug-in ground light 10, and conveniently disassemble and replace components of the plug-in ground light 10 in case of a problem. In particular, due to this structure, the user may conveniently replace the base plate 13111, the light guide member 13115, and the carrier member 13113 in different shapes, thereby expanding usage scenes.

The plug-in ground light 10 includes the ground plug pin 11, the light pole assembly 13, the light-emitting module 15, and the functional member 17. The light pole assembly 13 includes the mounting assembly 131 connected to the ground plug pin 11 and the protective cover 133 connected to the mounting assembly 131. The protective cover 133 has the open state and the closed state relative to the mounting assembly 131. The light-emitting module 15 is disposed in the mounting assembly 131, and the functional member 17 is disposed in the mounting assembly 131. In addition, when the protective cover 133 is in the open state, the functional member 17 is exposed. When the protective cover 133 is in the closed state, the protective cover 133 obscures the functional member 17. The functional member 17 is configured to control the at least one of the operating state, the luminous intensity, the luminous color, and the operating mode of the light-emitting module 15. The protective cover 133 may avoid an accidental contact generated because the functional member 17 is exposed, and may enable a waterproof function for the functional member 17, to ensure working reliability and service life of the functional member 17. Certainly, in some implementations, the protective cover 133 may further prevent the functional member 17 from being affected by dust, that is, dustproof effect. When the protective cover 133 is in the open state, the user can conveniently adjust the operating state, the luminous intensity, the luminous color, the working mode of the light-emitting module 15, thereby improving flexibility of controlling the plug-in ground light, and expanding the use scenes of the plug-in ground light 10. For example, the plug-in ground light 10 is used to create dynamic lighting effect during a courtyard party.

Embodiment 2

Figure 5:
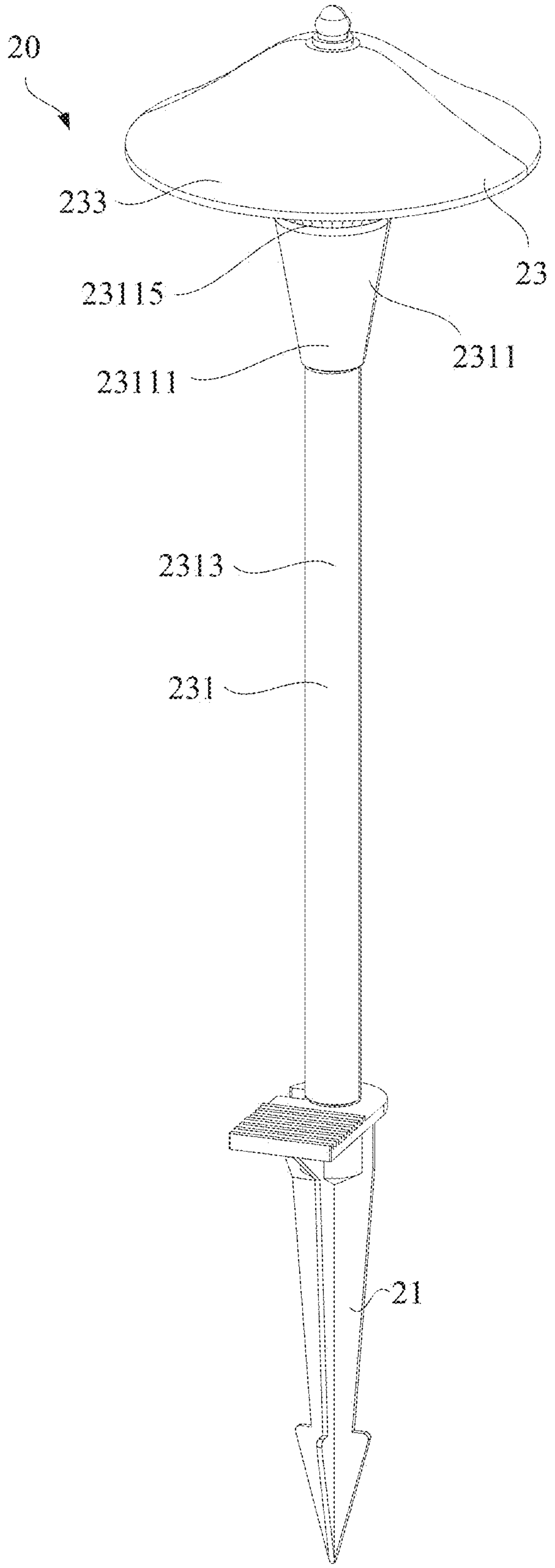
FIG. 5 is a schematic diagram of a protective cover of a plug-in ground light in a closed state according to Embodiment 2 of the present disclosure.
Figure 6:
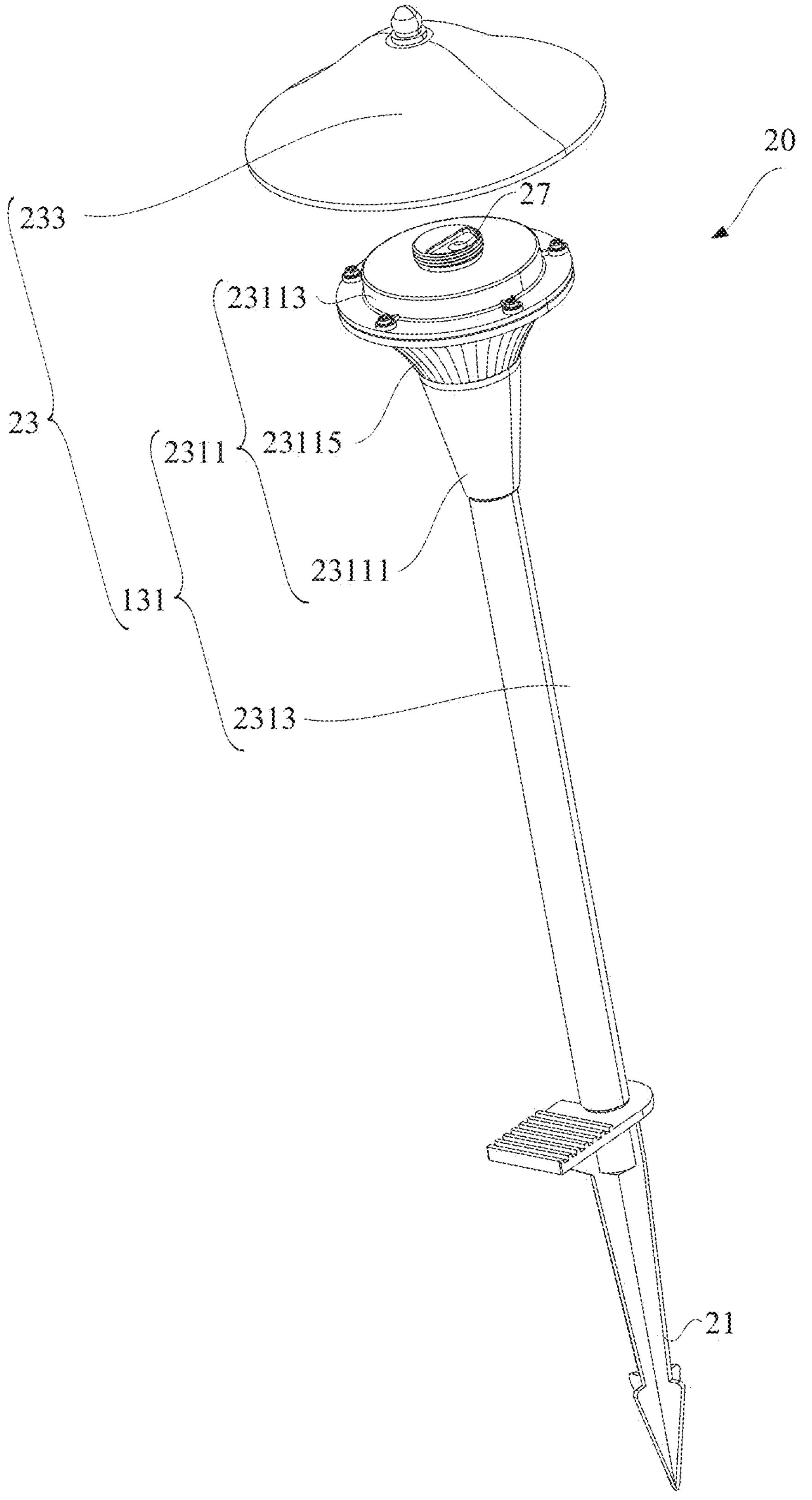
FIG. 6 is a schematic diagram of a protective cover of a plug-in ground light in an open state according to Embodiment 2 of the present disclosure.
Figure 7:
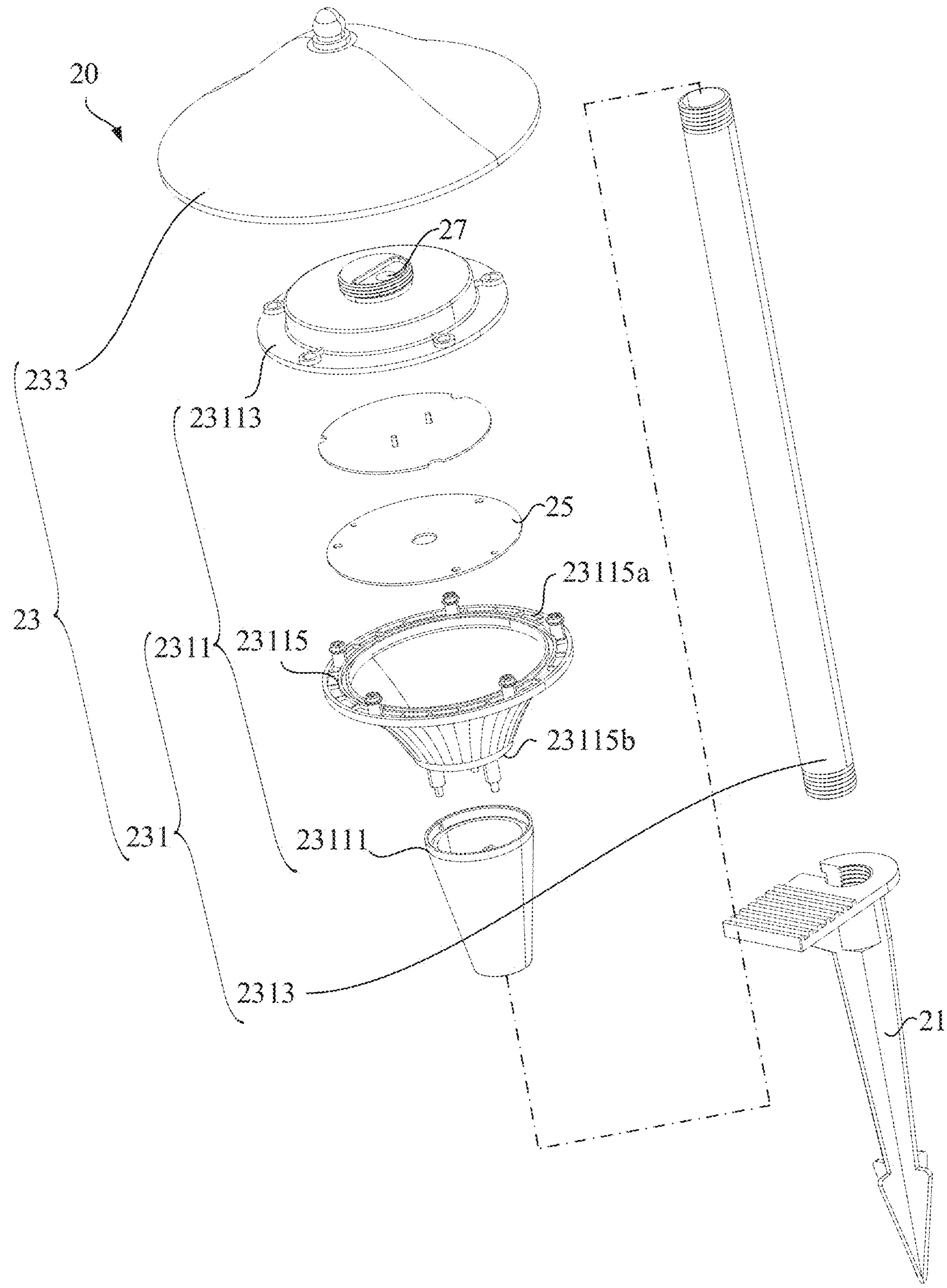
FIG. 7 is an exploded view of a plug-in ground light according to Embodiment 2 of the present disclosure.

Referring to FIG. 5, FIG. 6, and FIG. 7, Embodiment 2 of the present disclose provides a plug-in ground light 20. The plug-in ground light 20 includes a ground plug pin 21, a light pole assembly 23, a light-emitting module 25, and a functional member 27. The light pole assembly 23 is connected to the ground plug pin 21, and the light-emitting module 25 and the functional member 27 are disposed in the light pole assembly 23. One end of the ground plug pin 21 is relatively sharp and may be inserted into the ground, thereby reliably fixing the plug-in ground light 20 on the ground for providing lighting.

Figure 8:
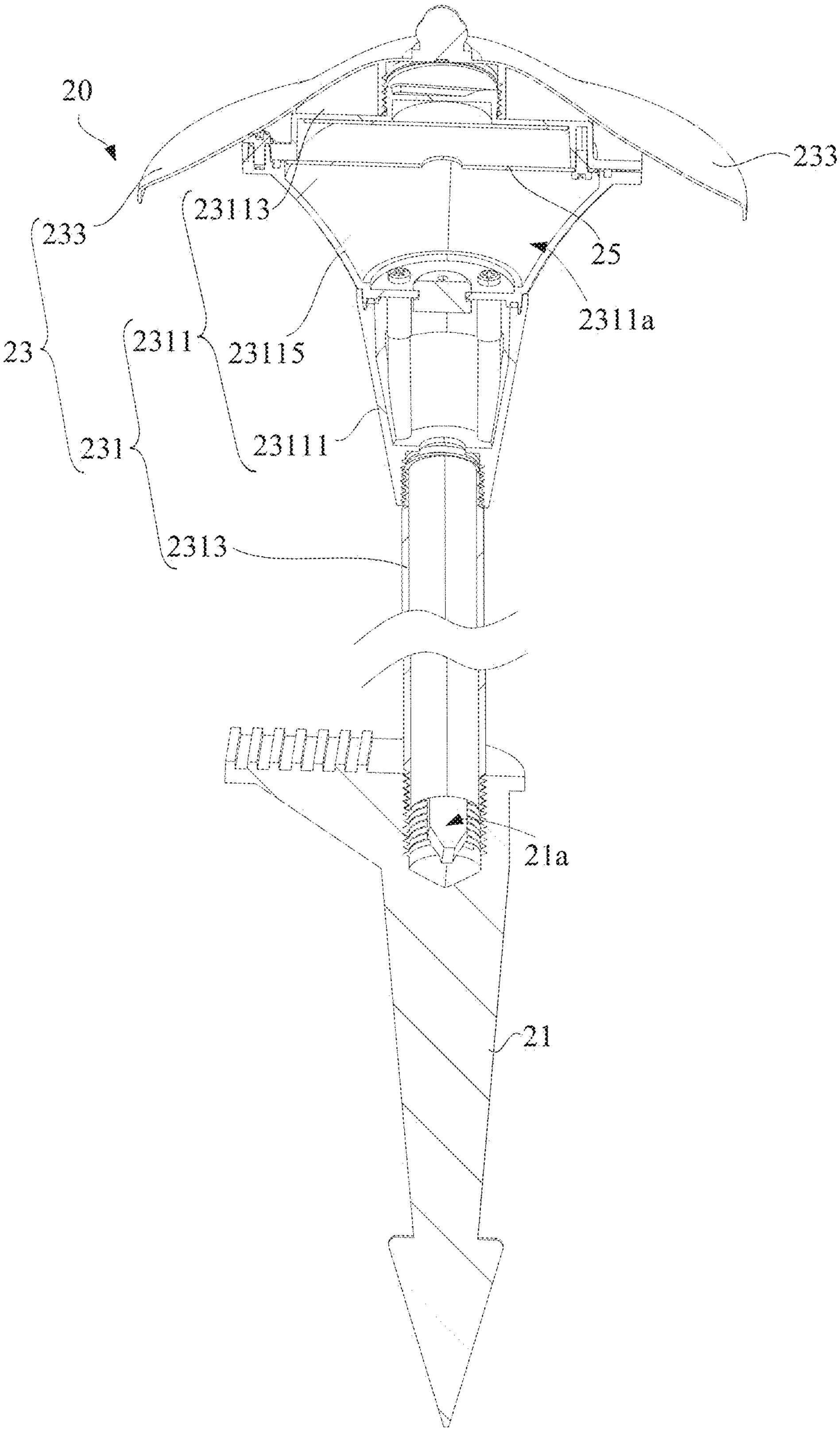
FIG. 8 is a sectional view of a plug-in ground light according to Embodiment 2 of the present disclosure.

In addition, referring to FIG. 8, similar to the embodiment 1, a light pole assembly 23 also includes a mounting assembly 231 connected to the ground plug pin 21 and a protective cover 233 connected to the mounting assembly 231. The light-emitting module 25 and the functional member 27 are disposed in the mounting assembly 231. The protective cover 233 has an open state and a closed state relative to the mounting assembly 231. The functional member 27 is in a telecommunication connection or a communication connection to the control circuit. The functional member 27 is not limited to a mechanical button or a touch button and may further be a trigger structure or an adjustment structure for providing another function. The embodiment 2 of the present disclosure takes a button as an example for description. When the protective cover 233 is in the open state, as shown in FIG. 6, the functional member 27 is exposed, and a user may press the button to control the operating state, the luminous intensity, the luminous color, the working mode of the light-emitting module 25. When the protective cover 233 is in the closed state, as shown in FIG. 5, the protective cover 233 obscures the functional member 27, to avoid an accidental contact generated because the functional member 27 is exposed, and may enable a waterproof function for the functional member 27, to ensure working reliability and service life of the functional member 27. Certainly, in some implementations, the protective cover 233 may further prevent the functional member 27 from being affected by dust, that is, dustproof effect.

In some implementations, the protective cover 233 is detachably connected to the light pole assembly 23. Specifically, in the embodiment 2 of the present disclosure, the mounting assembly 231 may also include a mounting base 2311 and a middle pole 2313. The light-emitting module 25 and the functional member 27 are disposed in the mounting base 2311. The middle pole 2313 is in a hollow tube shape, the ground plug pin 21 is detachably connected to the middle pole 2313, a wire hole 21*a* is provided at a junction, and the wire hole 21*a* is configured to allow a cable to pass through. The cable can pass through the middle pole 2313 and extend to the light-emitting module 25 of the mounting base 2311, to be in a telecommunication connection to the light-emitting module 25. The cable may be used for an external power supply, to supply power to the light-emitting module 25. In other implementations, the middle pole 2313 may be in other shapes such as a square tube shape, which is not described herein again.

Referring to FIG. 7 and FIG. 8, the mounting base 2311 includes a base plate 23111, a carrier member 23113, and a light guide member 23115 connected between the base plate 23111 and the carrier member 23113. The middle pole 2313 is connected to the base plate 23111, the light-emitting module 25 and the functional member 27 are disposed in the carrier member 23113, and the protective cover 233 is connected to the carrier member 23113. For example, in implementations in FIG. 7 and FIG. 8, the protective cover 233 is substantially tapered, has a relatively large holding area, and is connected to the carrier member 23113 in a threaded manner. The protective cover 233 may be easily unscrewed from the carrier member 23113 without the use of other tools, thereby exposing the functional member 27 and facilitating an operation by the user. After the operation is completed, the user can conveniently mount the protective cover 233 in the carrier member 23113, thereby providing a waterproof function and protection for the functional member 27. In other implementations, the protective cover 233 may be replaced with a structure in which a side is rotatably connected to the carrier member 23113. Therefore, the protective cover 233 may be in the open state or the closed state relative to the carrier member 23113. This is not described herein again.

The carrier member 23113 may be used to provide mounting space for the circuit board and light-emitting module 25 of the plug-in ground light 20, limit and protect the circuit board and light-emitting module 25 of the plug-in ground light 20. The carrier member 23113 may be a metal member, or a non-metallic member with relatively low light transmittance, for example, a plastic member or a ceramic member. In the implementations FIG. 7 and FIG. 8, a cross-section of the light guide member 23115 is substantially in a shape of a trapezoid with a curved side, and the protective cover 233 is covered on the light guide member 23115. Specifically, the light guide member 23115 includes a first end 23115*a* and a second end 23115*b* that are opposite to each other, outer contours of the first end 23115*a* and the second end 23115*b* are circular, and an outer diameter of the first end 23115*a* is larger than an outer diameter of the second end 23115*b*. The protective cover 233 is disposed on the carrier member 23113, and an outer diameter of the protective cover 233 is larger than the outer diameter of the first end 23115*a*. The base plate 23111 is connected to the second end 23115*b*, the carrier member 23113 is connected to the first end 23115*a*, and in an axial direction of the middle pole 2313, an outer diameter of the light guide member 23115 gradually decreases from the first end 23115*a* to the second end 23115*b*.

A material of the light guide member 23115 may be plastic or glass with suitable light transmittance. Light emitted from the light-emitting module 25 may be emitted to the light guide member 23115, and a propagation direction of the light may be changed via the light guide member 23115, for example, by dispersing the light, thereby expanding an irradiation range of the light-emitting module 25. A gain pattern may further be disposed on a circumferential surface of the light guide member 23115, thereby changing light-emitting effect and expanding the use scenes of the plug-in ground light 20.

Differences with the embodiment 1 lie in that shapes of the base plate 23111, the light guide member 23115, the carrier member 23113, and the protective cover 233 are changed significantly, the base plate 23111, the carrier member 23113, and the light guide member 23115 form the mounting cavity 2311*a*, and the light-emitting module 25 is disposed in the mounting cavity 2311*a*. An inner surface of the light guide member 23115 may be a conical surface or a parabolic surface. Therefore, light in the mounting cavity 2311*a* is reflected via the inner surface of the light guide member 23115, to implement diffusing effect and improve a utilization rate of light energy. For the function and working principle of the above components, refer to the embodiment 1. This is not described in the present disclosure.

In the embodiment 2 of the present disclosure, the two opposite ends of the middle pole 2313 may further be detachably connected to the base plate 23111 in a one-to-one correspondence manner, to improve convenience for assembling the middle pole 2313, the ground plug pin 21, and the base plate 23111, and improve convenience for transporting, disassembling, and maintaining the plug-in ground light 20, thereby enabling the user to conveniently assemble the plug-in ground light 20, and conveniently disassemble and replace the plug-in ground light 20 in case of a problem. Similarly, the base plate 23111 may also be detachably connected to the light guide member 23115, the light guide member 23115 may also be detachably connected to the carrier member 23113, the carrier member 23113 may also be detachably connected to the protective cover 233, to improve convenience for assembling the base plate 23111, the carrier member 23113, and the light guide member 23115, and improve convenience for transporting, disassembling, and maintaining the plug-in ground light 20, thereby enabling the user to conveniently assemble the plug-in ground light 20, and conveniently disassemble and replace the plug-in ground light 20 in case of a problem. In particular, due to this structure, the user may conveniently replace the base plate 23111, the light guide member 23115, and the carrier member 23113 in different shapes, thereby expanding usage scenes. This is not described herein again.

The technical features of the foregoing embodiments can be employed in arbitrary combinations. For brevity of description, not all possible combinations of the technical features of the foregoing embodiments are described. However, the combinations of the technical features should be construed as falling within the scope described in this specification as long as there is no contradiction in the combinations.

The above described are merely several implementations of the present disclosure. Although the embodiments are described specifically and in detail, they should not be construed as a limitation to the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the protection scope defined by the claims.

What is claimed is:

1. A plug-in ground light, comprising:
- a ground plug pin;
- a light pole assembly, comprising a mounting assembly connected to the ground plug pin and a protective cover connected to the mounting assembly, wherein the protective cover has an open state and a closed state relative to the mounting assembly;
- a light-emitting module, disposed in the mounting assembly; and
- a functional member, disposed in the mounting assembly, wherein when the protective cover is in the open state, the functional member is exposed; when the protective cover is in the closed state, the protective cover obscures the functional member; and the functional member is configured to control at least one of an operating state, luminous intensity, a luminous color, and an operating mode of the light-emitting module.

2. The plug-in ground light according to claim 1, wherein the protective cover is detachably connected to the light pole assembly.

3. The plug-in ground light according to claim 1, wherein the protective cover is rotatably connected to the light pole assembly.

4. The plug-in ground light according to claim 1, wherein the light pole assembly comprises a mounting base and a middle pole, the light-emitting module and the functional member are disposed in the mounting base, the middle pole has one end connected to the ground plug pin and the other end connected to the mounting base, and the protective cover is connected to the mounting base.

5. The plug-in ground light according to claim 4, wherein the middle pole is in a hollow tube shape, the ground plug pin is detachably connected to the middle pole, a wire hole is provided at a junction of the ground plug and the middle pole, the wire hole is configured to allow a cable to pass through, and the cable passes through the middle pole and extends to the light-emitting module of the mounting base.

6. The plug-in ground light according to claim 5, wherein the mounting base comprises a base plate, a carrier member, and a light guide member connected between the base plate and the carrier member, the middle pole is connected to the base plate, the light-emitting module and the functional member are disposed in the carrier member, and the protective cover is connected to the carrier member.

7. The plug-in ground light according to claim 6, wherein two opposite ends of the middle pole are connected to the mounting base and the ground plug pin respectively in a threaded manner.

8. The plug-in ground light according to claim 6, wherein the base plate and the carrier member are detachably connected to the light guide member.

9. The plug-in ground light according to claim 6, wherein the base plate, the carrier member, and the light guide member form a mounting cavity, and the light-emitting module is disposed in the mounting cavity.

10. The plug-in ground light according to claim 9, wherein the light guide member comprises a first end and a second end that are opposite to each other, outer contours of the first end and the second end are circular, an outer diameter of the first end is larger than an outer diameter of the second end, the base plate is connected to the second end, the carrier member is connected to the first end, and in an axial direction of the middle pole, an outer diameter of the light guide member gradually decreases from the first end to the second end.

11. The plug-in ground light according to claim 10, wherein the protective cover is disposed on the carrier member, and an outer diameter of the protective cover is larger than the outer diameter of the first end.

12. The plug-in ground light according to claim 6, wherein a through hole is axially provided on the light guide member, the through hole extends from one end of the light guide member to the other end of the light guide member, the through hole communicates with an interior of the middle pole and configured to allow the cable to pass through.

13. The plug-in ground light according to claim 12, wherein one end, away from the carrier member, of the light guide member is recessed towards a side on which the carrier member is located, to form a groove, and the groove communicates with the through hole.

14. The plug-in ground light according to claim 12, wherein the mounting base comprises two sealing members, the sealing member is in an annulus shape and circumferentially provided with an accommodation groove, a convex ring matching the accommodation groove is disposed at each of two opposite ends of the light guide member, one sealing member is configured to seal a gap between the light guide member and the base plate, and the other sealing member is configured to seal a gap between the carrier member and the light guide member.

15. The plug-in ground light according to claim 12, wherein the mounting base comprises a reflective sheet, and the reflective sheet is disposed on a side, facing the light-emitting module, of the base plate.

* * * * *